(12) United States Patent
Fang et al.

(10) Patent No.: US 11,461,911 B2
(45) Date of Patent: Oct. 4, 2022

(54) DEPTH INFORMATION CALCULATION METHOD AND DEVICE BASED ON LIGHT-FIELD-BINOCULAR SYSTEM

(71) Applicant: Tsinghua University, Beijing (CN)

(72) Inventors: Lu Fang, Beijing (CN); Dingjian Jin, Beijing (CN); Anke Zhang, Beijing (CN); Qionghai Dai, Beijing (CN)

(73) Assignee: Tsinghua University, Beijing (CN)

( * ) Notice: Subject to any disclaimer, the term of this patent is extended or adjusted under 35 U.S.C. 154(b) by 257 days.

(21) Appl. No.: 17/034,563

(22) Filed: Sep. 28, 2020

(65) Prior Publication Data

US 2021/0118162 A1 Apr. 22, 2021

(30) Foreign Application Priority Data

Oct. 22, 2019 (CN) .......................... 201911005533.8

(51) Int. Cl.
*G06T 7/557* (2017.01)
*G06T 7/80* (2017.01)
(Continued)

(52) U.S. Cl.
CPC ............... *G06T 7/557* (2017.01); *G06T 7/80* (2017.01); *H04N 13/128* (2018.05); *H04N 13/246* (2018.05); *H04N 2013/0081* (2013.01)

(58) Field of Classification Search
CPC ......... G06T 7/557; G06T 7/80; H04N 13/128; H04N 13/246; H04N 2013/0081
See application file for complete search history.

(56) References Cited

U.S. PATENT DOCUMENTS 8,355,565 B1 * 1/2013 Yang ...................... G06T 7/593
382/154
8,619,082 B1 * 12/2013 Ciurea ................ H04N 13/128
382/154
(Continued)

OTHER PUBLICATIONS

Chen, J. et al., "Accurate Light Field Depth Estimation with Superpixel Regularization over Partially Occluded Regions", arXiv:1708.01964v1 [cs.CV], Aug. 7, 2017.
(Continued)

*Primary Examiner* — Brian P Yenke
(74) *Attorney, Agent, or Firm* — David D. Brush; Westman, Champlin & Koehler, P.A.

(57) ABSTRACT

A depth information calculation method and device based on a light-field-binocular system. The method includes obtaining a far-distance disparity map based on binocular information of calibrated input images, setting respective first confidences pixels in the disparity map, and obtaining a first target confidence; detecting the first confidence of a pixel being smaller than a preset value and responsively determining a new disparity value based on light field information of the input images, determining an update depth value based on the new disparity value, and obtaining a second target confidence of the pixel; and combining the far-distance disparity map and a disparity map formed by the new disparity value on a same unit into an index map, combining the first confidence and the first target confidence into a confidence map, optimizing the index and confidence maps to obtain a final disparity map, which is converted to a final depth map.

15 Claims, 9 Drawing Sheets

(51) Int. Cl.
*H04N 13/128* (2018.01)
*H04N 13/246* (2018.01)
*H04N 13/00* (2018.01)

(56) References Cited

U.S. PATENT DOCUMENTS

| | | | | |
|---|---|---|---|---|
| 9,165,401 | B1* | 10/2015 | Kim | H04N 13/275 |
| 9,519,972 | B2* | 12/2016 | Venkataraman | G06T 1/20 |
| 9,704,250 | B1* | 7/2017 | Shah | H04N 5/2351 |
| 9,774,837 | B2* | 9/2017 | Chang | H04N 9/3185 |
| 9,792,685 | B2* | 10/2017 | Chou | H04N 13/239 |
| 9,804,395 | B2* | 10/2017 | Wu | G06T 11/00 |
| 9,918,072 | B2* | 3/2018 | Kim | H04N 13/25 |
| 10,091,484 | B2* | 10/2018 | Hu | G06T 7/0002 |
| 10,326,979 | B2* | 6/2019 | Hall | G06V 10/24 |
| 10,482,627 | B2* | 11/2019 | Kim | H04N 13/239 |
| 10,602,126 | B2* | 3/2020 | Rowell | H04N 9/8715 |
| 10,645,368 | B1* | 5/2020 | Yu | G06N 3/08 |
| 10,659,677 | B2* | 5/2020 | Nobori | H04N 5/23296 |
| 10,728,520 | B2* | 7/2020 | Kamal | G06T 5/50 |
| 10,764,559 | B2* | 9/2020 | Ge | G06T 7/521 |
| 10,805,589 | B2* | 10/2020 | Venkataraman | H04N 13/243 |
| 10,855,909 | B2* | 12/2020 | Yao | G06T 7/80 |
| 11,308,579 | B2* | 4/2022 | Wang | H04N 13/246 |
| 2015/0077522 | A1* | 3/2015 | Suzuki | G02B 27/0075 |
| | | | | 348/47 |
| 2019/0182475 | A1* | 6/2019 | Wu | H04N 13/271 |
| 2020/0036905 | A1* | 1/2020 | Chang | H04N 13/243 |
| 2020/0357141 | A1* | 11/2020 | Zhou | H04N 13/239 |
| 2021/0274150 | A1* | 9/2021 | Chen | H04N 13/246 |
| 2021/0321078 | A1* | 10/2021 | Meng | G06T 7/85 |
| 2021/0327136 | A1* | 10/2021 | Steger | G06T 7/85 |
| 2021/0385425 | A1* | 12/2021 | Sun | G06T 7/73 |
| 2022/0044433 | A1* | 2/2022 | Cui | G06T 7/80 |
| 2022/0046219 | A1* | 2/2022 | Obla | G06T 7/593 |
| 2022/0046220 | A1* | 2/2022 | Zhong | G06T 7/246 |
| 2022/0178688 | A1* | 6/2022 | Wang | G03B 13/20 |

OTHER PUBLICATIONS

Wang, TC. et al. "Depth Estimation with Occlusion Modeling Using Light-Field Cameras", Abstract, DOI : 10.1109/TPAMI.2016. 2515615, IEEE Transactions on Pattern Analysis and Machine Intelligence ( vol. 38, Issue: 11, Nov. 1, 2016).
Tao, M. et al., "Depth from Combining Defocus and Correspondence Using Light-Field Cameras", ISSV2013, Proceedings of the 2013 IEEE International Conference on Computer Vision, DOI:10. 1109/ICCV.2013.89, Dec. 2013.
Berthold, H. et al., "Determining Optical Flow", Artificial Intelligence, https://doi.org/10.1016/0004-3702(81)90024-2, (vol. 17, Issues 1-3, dated Aug. 1981, pp. 185-203).
Bao, L et al., "Fast Edge-Preserving PatchMatch for Large Displacement Optical Flow", CVRP2014, DOI: 10.1109/TIP.2014. 2359374, IEEE Transactions on Image Processing ( vol. 23, Issue: 12, Dec. 2014).
Dansereau, D. et al., "LiFF: Light Field Features in Scale and Depth", arXiv:1901.03916v1 [cs.CV], Jan. 13, 2019.
Chen, C. et al., "Light Field Stereo Matching Using Bilateral Statistics of Surface Cameras", CVRP2014, DOI: 10.1109/CVPR. 2014.197, 2014 IEEE Conference on Computer Vision and Pattern Recognition.
Yu, Z. et al., "Line Assisted Light Field Triangulation and Stereo Matching", DOI: 10.1109/ICCV.2013.347, 2013 IEEE International Conference on Computer Vision.
Bruhn, A. et al., "Lucas/Kanade Meets Horn/Schunck: Combining Local and Global Optic Flow Methods", International Journal of Computer Vision 61(3), 211-231, 2005.
Scott McCloskey, "Masking Light Fields to Remove Partial Occlusion", DOI: 10.1109/ICPR.2014.358, 2014 22nd International Conference on Pattern Recognition.
Lu, J. et al., "PatchMatch Filter: Efficient Edge-Aware Filtering Meets Randomized Search for Fast Correspondence Field Estimation", DOI: 10.1109/CVPR.2013.242, 2013 IEEE Conference on Computer Vision and Pattern Recognition.
Kim, C., et al., "Scene Reconstruction from High Spatio-Angular Resolution Light Fields" ACM Transactions on Graphics, Article No. 73, https://doi.org/10.1145/2461912.2461926, Jul. 2013.
"Single Lens 3D Camera with Extended Depth of Field", Powerpoint, Website: www.raytrix.de, raytrix, 2012.
Bishop, T. et al., "The Light Field Camera: Extended Depth of Field, Aliasing, and Superresolution", IEEE Transactions on Pattern Analysis and Machine Intelligence ( vol. 34, Issue: 5, May 2012).
Black, M. et al., "The Robust Estimation of Multiple Motions: Parametric and Piecewise-Smooth Flow Fields", Computer Vision and Image Understanding (vol. 63, Issue 1, Jan. 1996, pp. 75-104).
Wanner, S. et al., "Globally Consistent Depth Labeling of 4D Light Fields", Heidelberg Collaboratory for Image Processing, DOI: 10.1109/CVPR.2012.6247656, 2012 IEEE Conference on Computer Vision and Pattern Recognition.
Wang, T. et al., "Light Field Video Capture Using a Learning-Based Hybrid Imaging System", arXiv:1705.02997v1 [cs.CV], https://doi.org/http://dx.doi.org/10.1145/3072959.3073614, May 8, 2017.

\* cited by examiner

DEPTH INFORMATION CALCULATION METHOD AND DEVICE BASED ON LIGHT-FIELD-BINOCULAR SYSTEM

CROSS REFERENCE TO RELATED APPLICATIONS

This application claims priority and benefits to Chinese Application No. 201911005533.8, filed on Oct. 22, 2019, the entire content of which is incorporated herein by reference.

TECHNICAL FIELD

The present disclosure relates to the field of computer vision technique, and more particularly, to a depth information calculation method and a depth information calculation device based on a light-field-binocular system.

BACKGROUND

Depth detection is commonly used in applications, such as three-dimensional sensing, robotics, and autonomous driving. A passive solution like light field camera (such as Lytro, Raytrix) and binocular camera, benefited from compatibility of indoor and outdoor scenes, has been a research hotspot in decades. Accuracy and detection range of a depth map are the most important research directions in depth study. Although existing works, such as stereo matching, light field, single view by learning, involve technical solutions of providing the detection range of the depth map on various scales, it is impossible to provide measurement on a scale of full depth. For example, a light field camera has a high angle resolution (an angle view of being densely sampled), but has a small baseline for a region having at a far distance. Therefore, the light field camera is unable obtain depth for an object at a far distant. A stereo camera with a large baseline may have a good performance on scene at the far distant, but has a limited angle resolution (an angle view of being sparsely sampled) for an object at a close distance. Therefore, it may be difficult for the stereo camera to obtain the depth of the object at the close distance.

SUMMARY

Embodiments of a first aspect of the present disclosure provide a depth information calculation method based on a light-field-binocular system. The method includes: constructing a light-field-binocular system by a monocular camera and a light field camera; calibrating an image obtained by the light field camera and an image obtained by the monocular camera to generate an image pattern after encoding calibrated images, and determining images in the image pattern as input images of an algorithm; obtaining a far-distance disparity map based on binocular information of the input images, setting a first confidence for each pixel in the disparity map, and obtaining a first tarte confidence. In response to detecting that the first confidence of a pixel is smaller than a preset value, changing a range for calculating the disparity, determining a new disparity value based on light field information of the input images, determining an updated depth value based on the new disparity value to replace an original depth value of the pixel, obtaining a second target confidence of the pixel; combining the disparity maps obtained based on a binocular manner and a light field manner on a same unit to obtain an index map, combining the first confidence and the first target confidence into a confidence map, optimizing the index map and the confidence map to obtain a final disparity map; and converting the final disparity map to a final depth map.

Embodiments of the present disclosure provide an electronic device. The electronic device includes a processor and a memory, having a computer program stored thereon. When the computer program is executed by the processor, the processor is configured to execute the method described above.

Embodiments of the present disclosure provide a non-transitory computer readable storage medium, having one or more computer programs stored thereon. When the one or more computer programs are executed by a processor, the method described above is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
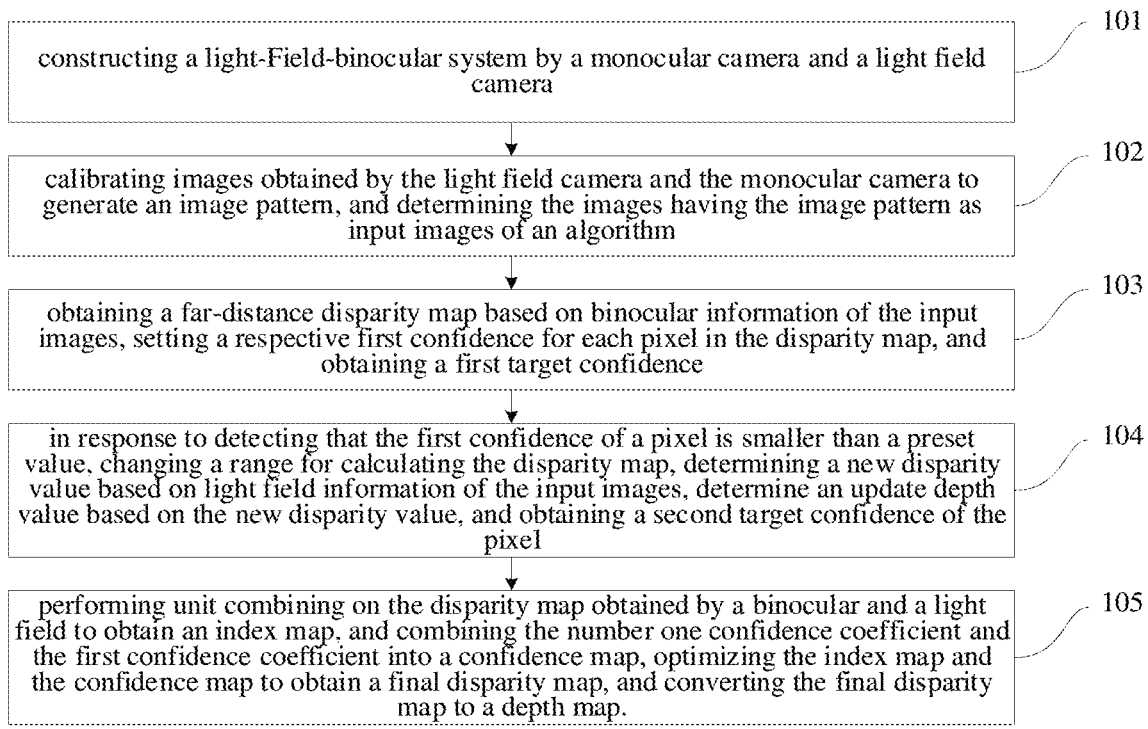
FIG. 1 is a flowchart illustrating a depth information calculation method based on a light-field-binocular system according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

According to embodiments of the present disclosure, the stereo matching may be combined with the light field, for a large-scale depth range estimation, although the above may require more than one light field camera for achieving other purposes. For example, Yan et al. obtained good depth information for a near-distance object by moving the light field camera. Dansereau et al. adopted three light field cameras to directly extract feature information based on a 4D (four-dimensional) model of the light field. Therefore, before discussing the depth information calculation method and device based on a light field binocular system according to embodiments of the present disclosure, some methods for calculating depth based on the light field and methods for calculating depth based on the stereo matching may be briefly introduced.

1. Depth Detection Based on Light Field

Detection on depth information based on the light field camera is similar to depth inference based on light flow and stereo matching, but the light field camera provides more viewpoints that are distributed densely, making EPI (epipolar-plane image) analysis possible. Perwass and Wietzke adopted communication information to estimate the depth of the light field camera. Bishop et al. proposed to iteratively search for a best match using corresponding clues and filters. Tao et al. proposed to estimate depth based on correspondence and defocus clues. Wanner et al. adopted depth marker constraint to estimate slope and direction of an EPI line. Yu et al. studied triangulation of ray space in 3D line geometry to improve reconstruction quality.

However, the above methods are mainly for possible position measurement of spatial points without considering a occlusion problem. Structural information is often used to solve the occlusion problem. Mc-Closkey et al. proposed foreground masker to avoid semi-occlusion. Kim et al. adopted a dense light field and fine-to-rough frames to allow reconstruction of a uniform region. Chen et al. adopted a bilateral filter to measure similarity from a central view to detect occlusion probability. Wang et al. proposed to adopt correspondence and refocus clues to form an occlusion-aware depth regularization system. Chen et al. adopted a weighted least square method and a super-pixel method to solve the semi-occlusion problem. Embodiments of the present disclosure establish a cross-baseline light field method based on the work of Chen et al.

2. Depth Detection Based on Binocular

Horn et al. proposed to couple a luminance constant to the spatial smoothness hypothesis, starting from an energy function, and proposed a variational method using light flow. Black et al. proposed a robust framework to deal with exception values, luminance instability, and spatial discontinuities. However, performing a complete search based on the above method is computationally impractical. Bruhn et al. adopted a coarse-to-fine and warp-based approach to realize computational utility, which is the most popular framework of using the light flow method. Dealing with large parallax is always an important research direction of the stereo matching, most of which is to use sparse points to deal with the large parallax, while A few of which is to use dense approximate nearest neighbor field (ANNF) to obtain a better result. Lu et al. adopted super-pixels to obtain a corresponding edge-aware field. Bao et al. adopted edge-aware bilateral data terms. However, in a case of missing information based on a single camera, the depth estimation is stilled not achieved using the stereo matching. In a complex situation, some learning-based methods are also proposed. However, these methods are individually trained and may not performed well in each application scene. In a case where the training data is based on the depth extracted by a conventional stereo matching method, the learning-based method is not performed well, since the conventional stereo matching method does not acquire the depth information of a near-distance object.

The depth information calculation method and device based on a light-field-binocular system are described with reference to the accompanying drawings.

FIG. 1 is a flowchart illustrating a depth information calculation method based on a light-field-binocular system according to embodiments of the present disclosure.

As illustrated in FIG. 1, the depth information calculation method based on the light-field-binocular system may include the following.

At block 101, a light-field-binocular system is constructed by a monocular camera and a light field camera.

Figure 2:
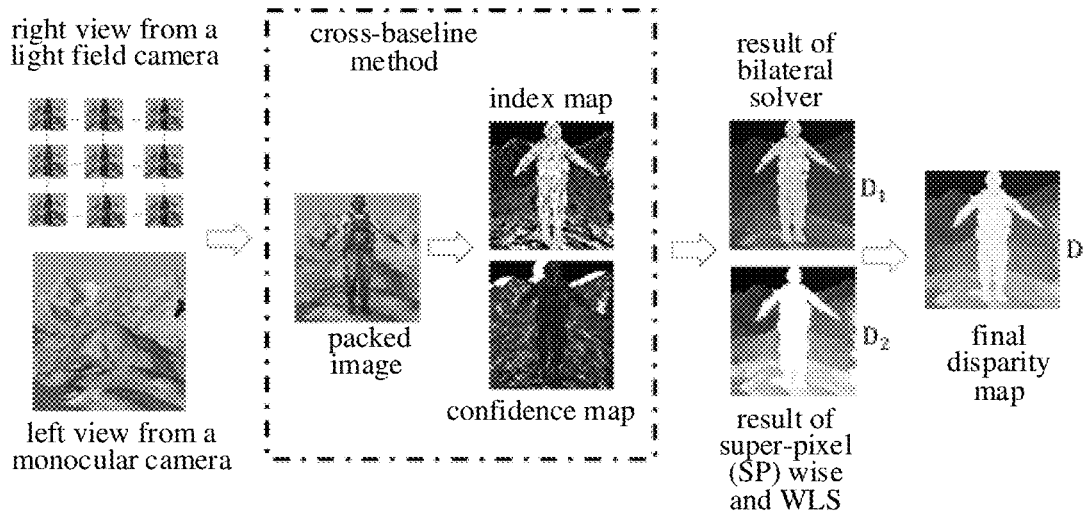
FIG. 2 is a schematic diagram illustrating a depth information calculation method based on a light-field-binocular system according to embodiments of the present disclosure.

It may be understood that, as illustrated in FIG. 2, in embodiments of the present disclosure, the binocular system formed by a common monocular high-definition camera and a lytro ilium light field camera is established.

After the light-field-binocular system is constructed, in embodiments of the present disclosure, the method may further include: calibrating internal parameters and external parameters of the light-field-binocular system.

At block 102, images obtained by the light field camera and the monocular camera are calibrated and encoded to generate an image pattern, and images having the image mode are determined as input images of an algorithm.

It may be understood that, as illustrated in FIG. 2, in an example, the image obtained by the light field camera and the image obtained by a common high-definition camera may be calibrated and encoded into a new image pattern. The images in the new image pattern may be determined as input images of the algorithm.

Further, in an example, calibrating the images obtained by the light field camera and the monocular camera to generate the image patterning after encoding, and determining the image having the image pattern as the input image of the algorithm may include: calibrating the images such that a resolution of the image obtained by the light field camera is same to a resolution of the image obtained by the monocular camera; and indexing data of a four-dimensional (4D) light field in a spatial domain. Each pixel corresponds to a preset spatial position.

Figure 3:
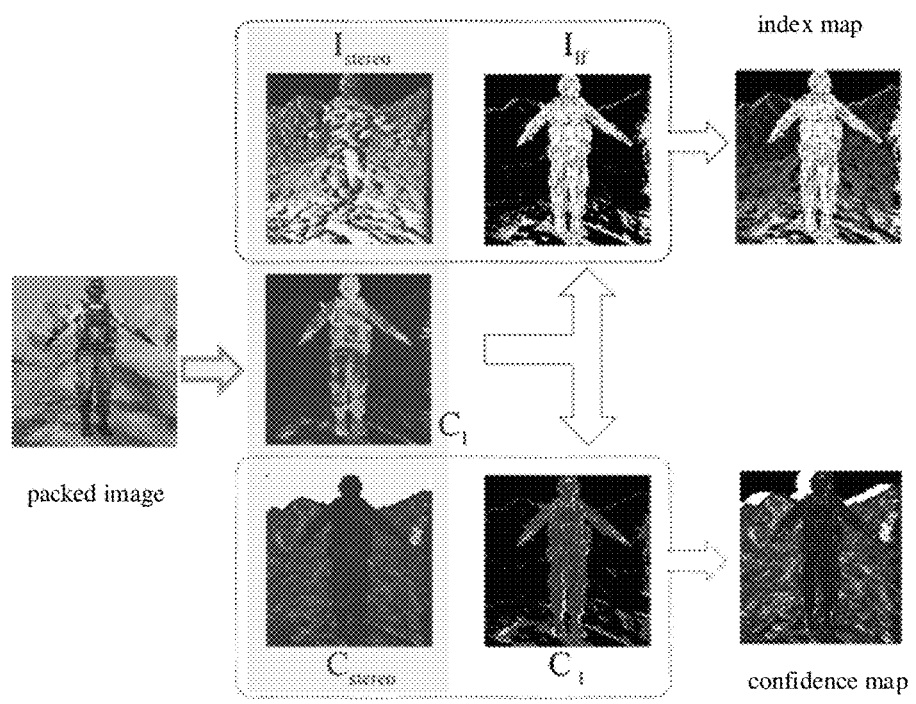
FIG. 3 is a block diagram illustrating a cross-baseline method as illustrated in FIG. 2 according to embodiments of the present disclosure.

In an example, raw data acquired by the light field camera may be decomposed into 225 sub-images. Viewpoints of each sub-image are slightly translated in horizontal and vertical directions from each other. In system calibration, the monocular image acquired by the monocular camera and a sub-image at a center of the light field (instead of the light field image) acquired by the light field camera are calibrated to avoid a large re-projection error caused by a small baseline among sub-images of the light field. In addition, in a case of small baseline, no rotation occurs between different viewpoints of the light field. Therefore, same calibration parameters may be applicable to calibrate the sub-image parallel with the monocular camera amongst the sub-images of the light field. The block diagram explaining the cross-baseline method will be described in FIG. 3.

At block 103, a far-distance disparity map is obtained based on binocular information from the input images, a first confidence is set for each pixel in the disparity map, and a first target confidence is obtained.

It may be understood that, in an example, a far-distance disparity map $I_{stereo}$ may be obtained using the binocular information from the input images. The first confidence $C_1$ may be set for each pixel in the disparity map and the first target confidence $C_{stereo}$ may be obtained. The first confidence is first proposed in embodiments of the present disclosure.

In detail, (1) the sub-image of the light field may be up-sampled to have a resolution same to the resolution of the monocular high-definition image.

Figure 4:
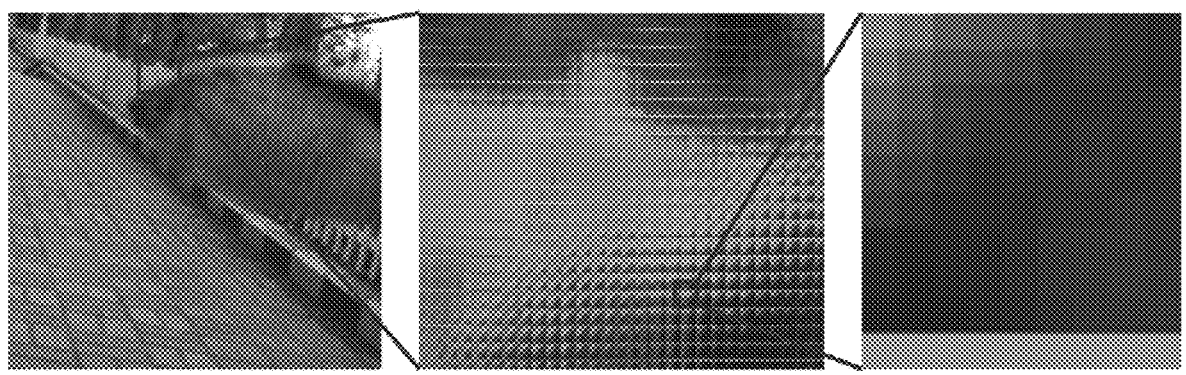
FIG. 4 illustrates examples of an input image according to embodiments of the present disclosure.

(2) As illustrated in FIG. 4, data of the 4D (four-dimensional) light field is indexed in the spatial domain. Each pixel corresponds to a spatial position. The 9×9 sub-images corresponding to views positioned closely to a center view are selected from 225 sub-images. The 9×9 sub-pixel array (the term "pixel" used herein refer to a set of sub-pixels in an angular domain) represents pixels of one input image. The first 9 rows of sub-pixels are from 81 different viewpoints of a light field camera having a small baseline, while 9 subpixels on a last row represent angular information of another baseline defined by the monocular camera.

At block 104, in response to detecting that the first confidence of a pixel is smaller than a preset value, a range for calculating disparity is changed. A new disparity value is determined based on the light field information of the input images. An updated depth value is calculated based on the new disparity value to replace an original depth value corresponding to the pixel and a second target confidence of the pixel is calculated.

In an example, the first confidence $C_1$ and the first target confidence $C_{stereo}$ may be calculated by:

$$C_1 = Var_{min},$$
$$C_{stereo} = \frac{Var_{mean}}{Var_{min}},$$

where, $Var_{min}$ is a minimum value of variances, and $Var_{mean}$ is an average value of variances.

Figure 6:
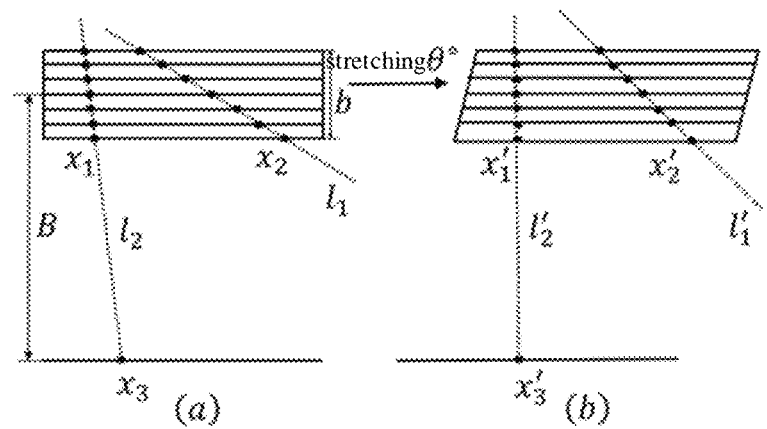
FIG. 6 is a schematic diagram illustrating EPI with monocular information according to embodiments of the present disclosure.
Figure 7:
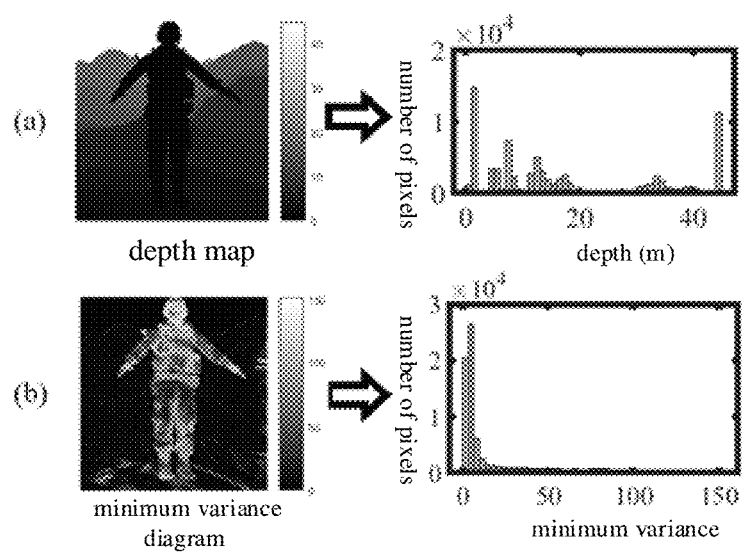
FIG. 7 is a schematic diagram illustrating a depth distribution in a spatial domain and a minimum variance distribution in an EPI domain according to embodiments of the present disclosure.

It may be understood that, in an example, the range for calculating the disparity may be changed when a pixel has a low first confidence. A new disparity value may be determined based on the light field information of the input images, which may be represented by $I_{if}$. The new disparity value is converted to a depth value to replace the original depth value corresponding to the pixel. In addition, the second target confidence $C_{if}$ of the pixel is obtained. Correspondence between the EPI and the variance is illustrated as FIG. 5. The EPI with monocular information is illustrated as FIG. 6. Depth distribution in the spatial domain and minimum variance distribution in the EPI domain are illustrated as FIG. 7.

Figure 5:
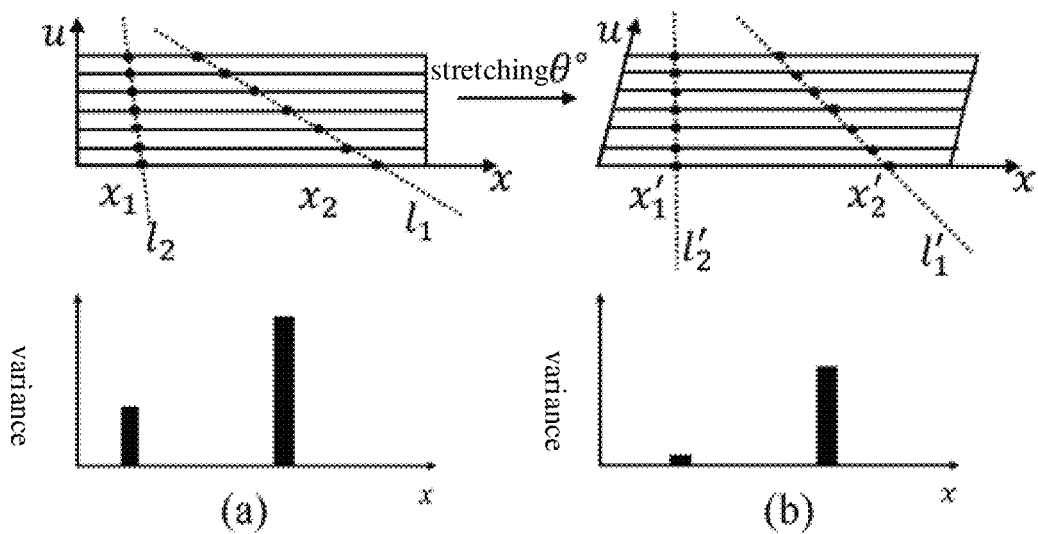
FIG. 5 is a schematic diagram illustrating a correspondence between EPI and variance according to embodiments of the present disclosure.

In detail, as illustrated in FIG. 5, in the EPI domain, for each pixel, each time the EPI is stretched, a variance may be obtained. For example, totally, res variances may be obtained after stretching the EPI for res times. An index $I_{stereo}$ corresponding to the minimum variance among the res variances may be determined, which may be proportional to the disparity value at the point of the pixel. In addition, a ratio of the average variance to the minimum variance may be determined as the first target confidence $C_{stereo}$, while the minimum variance of the res variances may be determined as the first confidence $C_1$. Pixels having the respective first confidence greater than a threshold $Var_{th}$ may be selected. For each of these selected pixels, the disparity value is too large such that the minimum variance is too large, which requires to calculate a new disparity value. The above may be represented by following equations 1, 2 and 3:

$$I_{stereo} = \text{index}(Var_{min}) \quad (1)$$

$$C_1 = Var_{min} \quad (2)$$

$$C_{stereo} = \frac{Var_{mean}}{Var_{min}} \quad (3)$$

where, $Var_{min}$ is a minimum value of variances, and $Var_{mean}$ is an average value of variances.

Further, for each of the above selected pixels, the disparity value is calculated using the light field information of the previous input images. The calculation method is also to determine the index corresponding to the minimum variance after the EPI is stretched for res times, which is denotes as $I_{if}$. The first target confidence corresponding to the respective pixel is denoted as $C_{if}$. The index $I_{if}$ is proportional to the disparity value of the point of the pixel.

At block 105, the disparity maps obtained based on a binocular manner and a light field manner are combined on a same unit into an index map. The first confidence and the first target confidence are combined into a confidence map. the index map and the confidence map are optimized to obtain a final disparity map. The final disparity map is converted into a final depth map.

In an example, a conversion formula of converting the disparity map into the depth map is represented by:

$$\text{Depth} = \begin{cases} \dfrac{f \times B}{D} \\ \dfrac{f \times b}{D} \end{cases},$$

where, D is a disparity map, f is a focal length of the camera, B is a baseline between the monocular camera and the light field camera, b is a baseline between sub-images of the light field camera.

It may be understood that, as illustrated in FIG. 2, the disparity maps obtained based on the binocular manner and the light field manner are combined on the same unit to obtain the index map with the conversion formula, and the confidences $C_{stereo}$ and $C_{if}$ may be combined into the confidence map. The obtained index map and the obtained confidence map are optimized to obtain the final disparity map with two algorithms. The final disparity map is converted to the final depth map.

In detail, in an example, the indexes $I_{if}$ and $I_{stereo}$ may be converted into the disparity value d corresponding to each pixel using the formula 4. All disparity values form the disparity map (index map). The second target confidence $C_{if}$ obtained at block 104 replaces the first target confidence $C_{stereo}$ to obtain the final confidence map. The above may be represented by an equation (4):

$$d = \begin{cases} \left[\alpha_{min1} + \dfrac{\alpha_{max1} - \alpha_{min1}}{Z_{res}} \times I_{stereo}\right] \times B \\ \left[\alpha_{min2} + \dfrac{\alpha_{max2} - \alpha_{min2}}{Z_{res}} \times I_{lf}\right] \times b \end{cases} \quad (4)$$

After the original index map and the original confidence map are obtained, two disparity maps D1 and D2 may be obtained using two algorithms: bilateral solver, super-pixel (SP) wise and WLS (weighted least square) optimization algorithm. The final disparity map D may be obtained using an equation (5):

$$D = D_1^{\alpha} \times D_2^{1-\alpha} \quad (5)$$

After the final disparity map D is obtained, the final disparity map may be converted into the final depth map using an equation (6):

$$\text{Depth} = \begin{cases} \dfrac{f \times B}{D} \\ \dfrac{f \times b}{D} \end{cases} \quad (6)$$

where, D is the final disparity map, f is a focal length of the camera, B is a baseline between the monocular camera and the light field camera, b is a baseline between sub-images of the light field camera.

Figure 8:
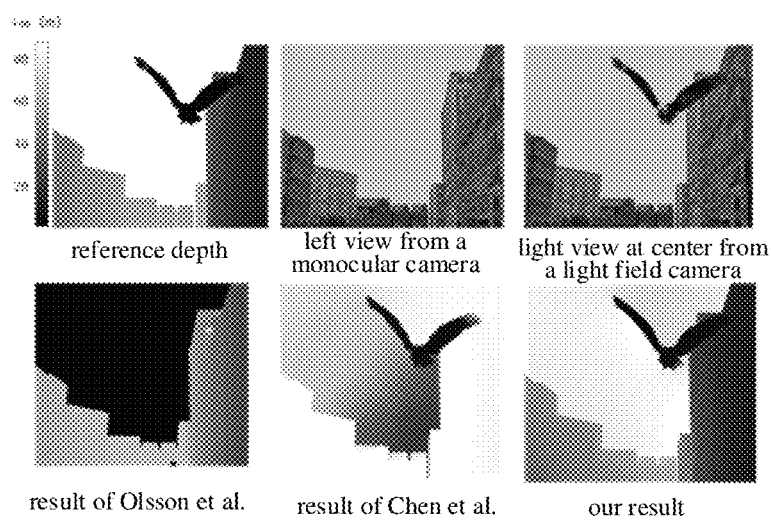
FIG. 8 illustrates comparison among a reference depth map, a part of an inputted raw image, a result according to embodiments of the present disclosure, and result of other methods.
Figure 9:
FIG. 9 is a diagram illustrating a depth information calculation device based on a light-field-binocular system according to embodiments of the present disclosure.
Figure 10:
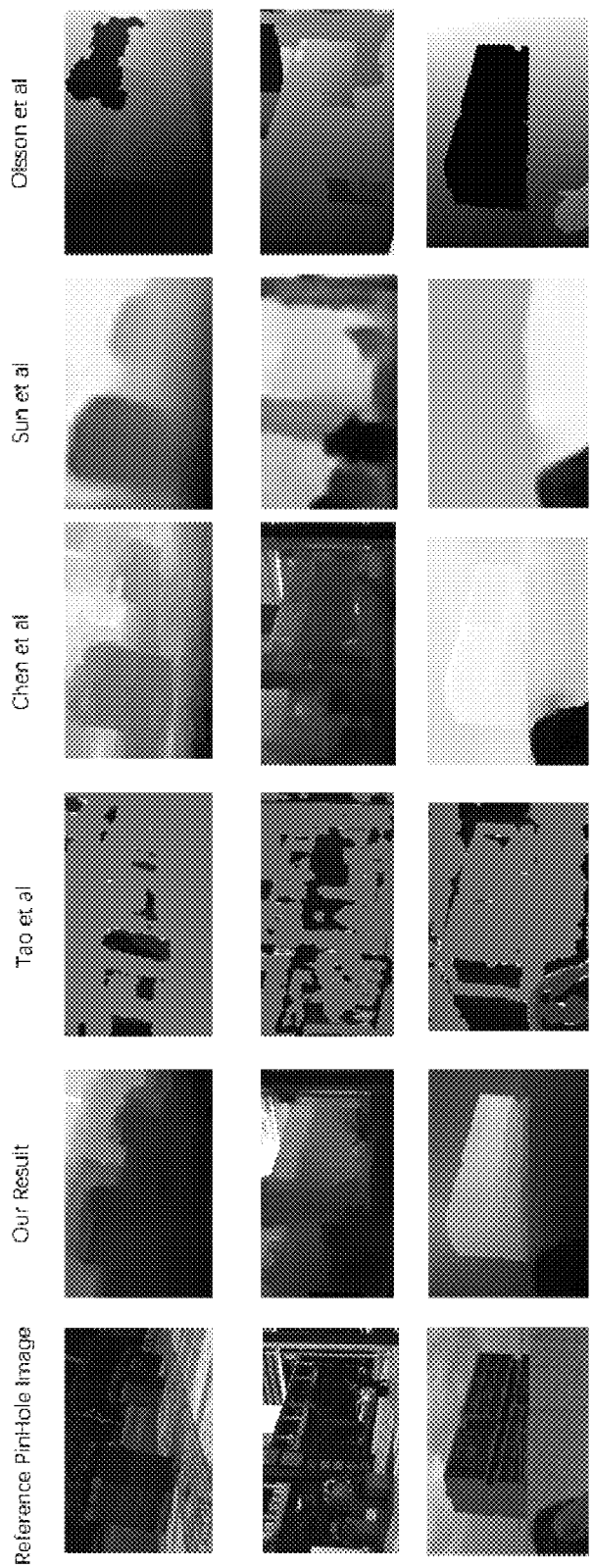
FIG. 10 illustrates comparison among an image according to embodiments of the present disclosure and images according to other methods.
Figure 11:
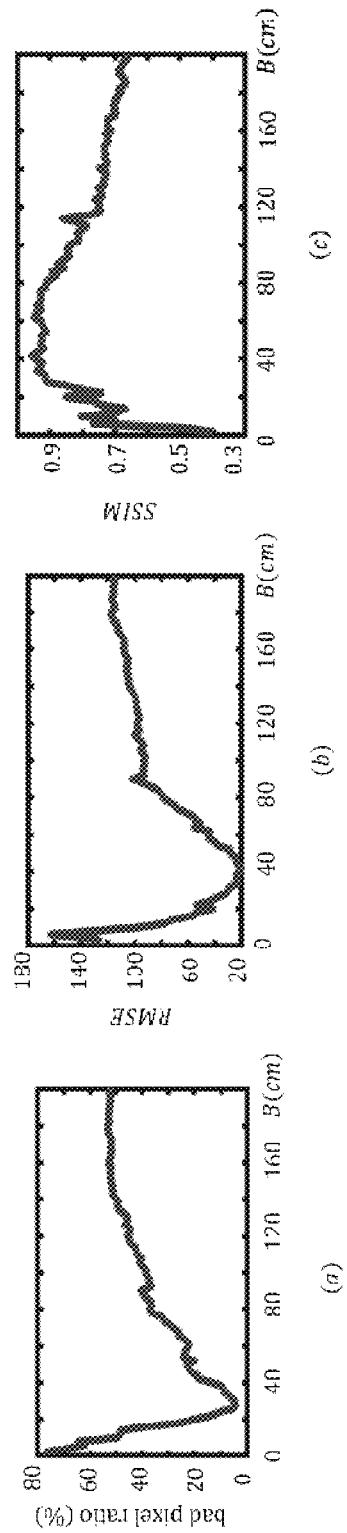
FIG. 11 is a diagram illustrating an evaluation parameter curve, according to embodiments of the present disclosure, obtained by transforming baseline (B) between monocular and light field.

It should be noted that, in order to more clearly illustrate the embodiments of the present disclosure or the technical solutions in the related art, the drawings used in the embodiments are briefly described below. Obviously, the drawings described below are only embodiments of the present disclosure, and other drawings can be obtained based on the drawings by those skilled in the art without any inventive works. FIG. 8 illustrates comparison among a reference depth map, a part of an inputted raw image, a result according to embodiments of the present disclosure, and result of other methods. FIG. 9 illustrates a depth information calculation device based on a light-field-binocular system according to embodiments of the present disclosure. FIG. 10 illustrates comparison among an image according to embodiments of the present disclosure and images according to other methods. FIG. 11 illustrates an evaluation parameter curve, according to embodiments of the present disclosure, obtained by transforming baseline (B) between monocular and light field.

In conclusion, with embodiments of the present disclosure, far-distant depth and near-distance depth may be obtained by a light field camera system under cases of different baseline sizes. In the method, a light field camera (lytro ilium) available on the market and a monocular camera available on the market may be used together. In embodiments of the present disclosure, the minimum variance of the EPI domain is determined as a reference basis to determine whether the depth of each pixel is calculated using cross-baseline camera information.

With the depth calculation method based on the light-field-binocular system according to embodiments of the present disclosure, accurate near-distance depth information may be obtained using the light field camera, and far-distance depth information may be obtained using a binocular camera. By replacing one camera in the conventional binocular camera system with the light field camera and based on theoretical analyses and algorithm implementation on EPI, accurate near-distance depth information and accurate far-distance depth information may be acquired. Compared with an existing depth acquisition algorithm using a light field camera, accurate depth information may be obtained without increasing computation amounts. Compared with an existing binocular camera system, in addition to acquiring accurate near-distance depth information, accurate gar-distance depth information may be obtained.

The depth information calculation device based on the light-field-binocular system will be described with reference to the accompanying drawings.

Figure 12:
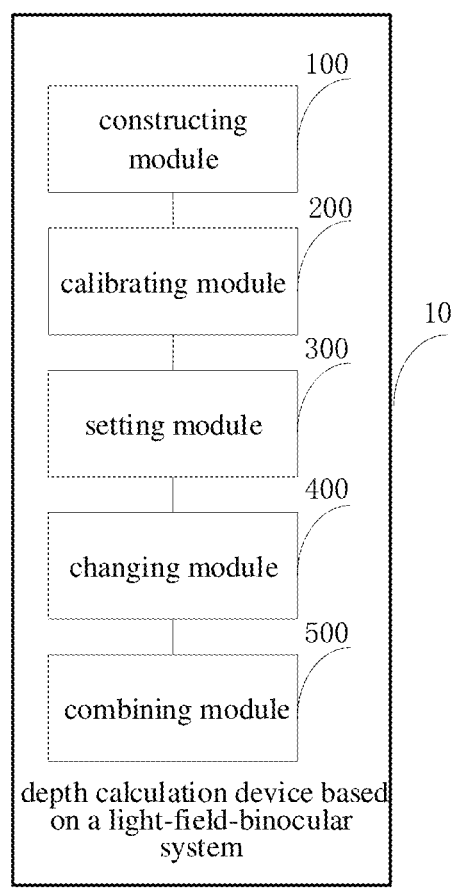
FIG. 12 is a schematic diagram illustrating a depth information calculation device based on a light-field-binocular system according to embodiments of the present disclosure.

FIG. 12 is a schematic diagram of a depth information calculation device based on a light-field-binocular system according to embodiments of the present disclosure.

As illustrated in FIG. 12, the depth information calculation device 10 based on the light-field-binocular system may include: a constructing module 100, a calibrating module 200, a setting module 300, a changing module 400, and a combining module 500.

The constructing module 100 may be configured to construct a light-field-binocular system by a monocular camera and a light field camera. The calibrating module 200 may be configured to calibrate images obtained by the light field camera and the monocular camera to generate an image pattern after encoding the calibrated images and to determine images having the image pattern as input images of an algorithm. The setting module 300 may be configured to obtain a far-distance disparity map based on binocular information of the input images, set a respective first confidence for each pixel in the disparity map, and obtain a first target confidence. The changing module 400 may be configured to, in response to detecting that the first confidence of a pixel is smaller than a preset value, change a range for calculating the disparity map, to determine a new disparity value based on the light field information of the input images, to determine an updated depth value based on the new disparity value to replace an original depth value of the pixel, and obtain a second target confidence of the pixel. The combining module 500 may be configured to combine the disparity maps obtained based on a binocular manner and a light field manner on a same unit into an index map, and to combine the first confidence and the first target confidence into a confidence map, to optimize the index map and the confidence map to obtain a final disparity map, and to convert the final disparity map into a final depth map. The device 10 according to embodiments of the present disclosure may obtain accurate far-distance depth information without increasing computation amounts. In addition, not only accurate near-distance depth information, but also accurate far-distance depth may be obtained.

In an example, the device 10 may further include: a calibrating unit. The calibrating unit may be configured to, after constructing the light-field-binocular system, calibrate internal parameters and external parameters of the light-field-binocular system.

In an example, the calibrating module 200 is further configured to: calibrate the images such that a resolution of the image obtained by the light field camera is same to a resolution of the image obtained by the monocular camera; and to index data of a four-dimensional light field in a spatial domain. Each pixel corresponds to a preset spatial position.

In an example, the first confidence and the first target confidence may be calculated by:

$$C_1 = Var_{min},$$
$$C_{stereo} = \frac{Var_{mean}}{Var_{min}},$$

where, $C_1$ is the first confidence, $C_{stereo}$ is the first target confidence, $Var_{min}$ is a minimum value of variances, and $Var_{mean}$ is an average value of variances.

In an example, a conversion formula converting the disparity map into the depth map is represented by:

$$Depth = \begin{cases} \frac{f \times B}{D} \\ \frac{f \times b}{D} \end{cases},$$

where, D is a disparity map, f is a focal length of the camera, B is a baseline between the monocular camera and the light field camera, b is a baseline between sub-images of the light field camera.

It should be noted that the foregoing description of the depth information calculation method based on light field binocular system is also applicable for the depth information calculation device based on light field binocular system of the embodiment, and details are not described herein again.

With the depth calculation device based on the light-field-binocular system according to embodiments of the present disclosure, accurate near-distance depth information may be obtained using the light field camera, and far-distance depth information may be obtained using a binocular camera. By replacing one camera in the conventional binocular camera system with the light field camera and based on theoretical analyses and algorithm implementation on EPI, accurate near-distance depth information and accurate far-distance depth information may be acquired. Compared with an existing depth acquisition algorithm using a light field camera, accurate depth information may be obtained without increasing computation amounts. Compared with an existing binocular camera system, in addition to acquiring accurate near-distance depth information, accurate gar-distance depth information may be obtained.

Figure 13:
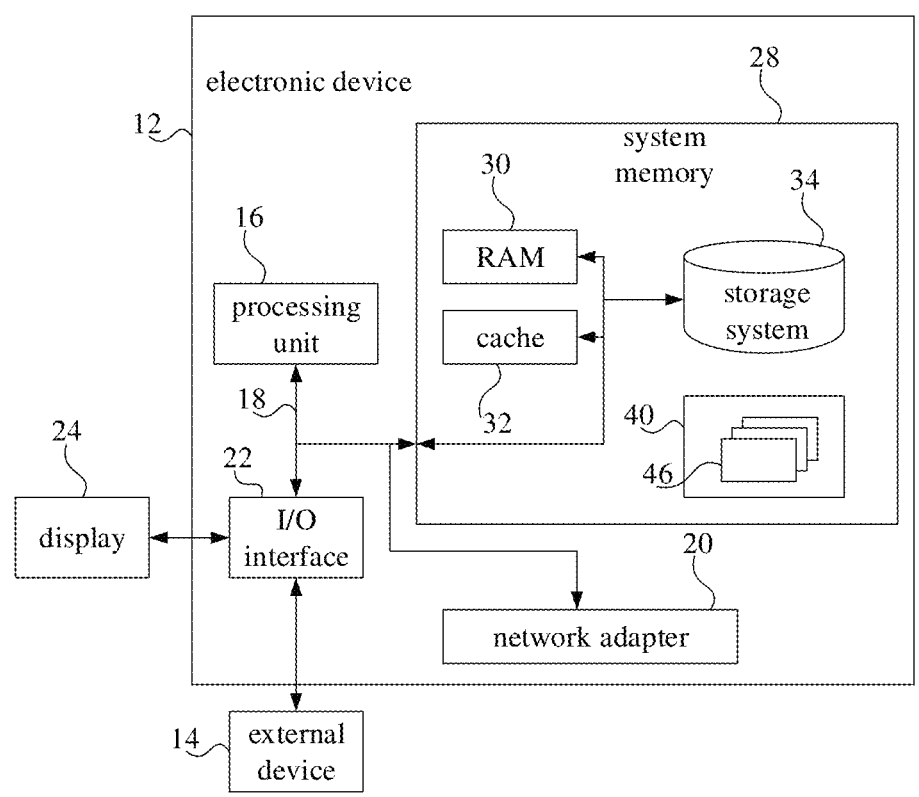
FIG. 13 is a block diagram illustrating an electronic device according to embodiments of the present disclosure.

FIG. 13 is a block diagram illustrating an electronic device according to embodiments of the present disclosure. The electronic device 12 illustrated in FIG. 13 is only illustrated as an example, and should not be considered as any restriction on the function and the usage range of embodiments of the present disclosure.

As illustrated in FIG. 13, the electronic device 12 is in the form of a general-purpose computing apparatus. The electronic device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronics standards association (VESA) local bus, and a peripheral component interconnect (PCI) bus.

Typically, the electronic device 12 may include multiple kinds of computer-readable media. These media may be any storage media accessible by the electronic device 12, including transitory or non-transitory storage medium and movable or unmovable storage medium.

The memory 28 may include a computer-readable medium in a form of volatile memory, such as a random access memory (RAM) 30 and/or a high-speed cache memory 32. The electronic device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 13 it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The electronic device 12 may also communicate with one or more external devices 14 (e.g., a keyboard, a pointing device, a display 24, and etc.) and may also communicate with one or more devices that enables a user to interact with the electronic device 12, and/or any device (e.g., a network card, a modem, and etc.) that enables the electronic device 12 to communicate with one or more other computing devices. This kind of communication can be achieved by the input/output (I/O) interface 22. In addition, the electronic device 12 may be connected to and communicate with one or more networks such as a local area network (LAN), a wide area network (WAN) and/or a public network such as the Internet through a network adapter 20. As illustrated in FIG. 13, the network adapter 20 communicates with other modules of the electronic device 12 over bus 18. It should be understood that although not shown in the figure, other hardware and/or software modules may be used in combination with the electronic device 12, which including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the depth information calculation method based on a light-field-binocular system according to embodiments of the present disclosure.

Embodiments of the present disclosure provides a non-transitory computer storage medium.

The computer storage medium of embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A depth information calculation method based on a light-field-binocular system, comprising:

constructing the light-field-binocular system by a monocular camera and a light field camera;

calibrating images obtained by the light field camera and the monocular camera to generate an image pattern, and determining the images having the image pattern as input images;

obtaining a far-distance disparity map based on binocular information of the input images, setting a respective first confidence for each pixel in the disparity map, and obtaining a first target confidence;

in response to detecting that the first confidence of a pixel is smaller than a preset value, determining a new disparity value based on light field information of the input images, determining an update depth value based on the new disparity value to replace an original depth value of the pixel, and obtaining a second target confidence of the pixel; and combining the far-distance disparity map and a disparity map formed by the new disparity value on a same unit into an index map, combining the first confidence and the first target confidence into a confidence map, optimizing the index map and the confidence map to obtain a final disparity map; and converting the final disparity map to a final depth map.

2. The method according to claim 1, further comprising:

calibrating internal parameters and external parameters of the light-field-binocular system.

3. The method according to claim 1, wherein calibrating the images obtained by the light field camera and the monocular camera to generate the image pattern, and determining the images having the image pattern as the input images, comprises:

calibrating the images such that a resolution of the image obtained by the light field camera is same to a resolution of the image obtained by the monocular camera; and indexing data of a four-dimensional light field in a spatial domain, wherein each pixel corresponds to a preset spatial position.

4. The method according to claim 1, wherein the first confidence and the first target confidence are calculated by:

$$C_1 = Var_{min},$$
$$C_{stereo} = \frac{Var_{mean}}{Var_{min}},$$

where, $C_1$ is the first confidence, $C_{stereo}$ is the first target confidence, $Var_{min}$ is a minimum value of variances, and $Var_{mean}$ is an average value of variances.

5. The method according to claim 1, wherein a conversion formula converting the disparity map into the depth map is represented by:

$$Depth = \begin{cases} \frac{f \times B}{D} \\ \frac{f \times b}{D} \end{cases},$$

where, D is the disparity map, f is a focal length of the camera, B is a baseline between the monocular camera and the light field camera, b is a baseline between sub-images of the light field camera.

6. An electronic device, comprising:
a processor; and
a memory, having a computer program stored thereon, wherein, when the computer program is executed by the processor, the processor is configured to:
construct the light-field-binocular system by a monocular camera and a light field camera;
calibrate images obtained by the light field camera and the monocular camera to generate an image pattern, and determine the images having the image pattern as input images;
obtain a far-distance disparity map based on binocular information of the input images, set a respective first confidence for each pixel in the disparity map, and obtain a first target confidence;
in response to detecting that the first confidence of a pixel is smaller than a preset value, determine a new disparity value based on light field information of the input images, determine an update depth value based on the new disparity value to replace an original depth value of the pixel, and obtain a second target confidence of the pixel; and
combine the far-distance disparity map and a disparity map formed by the new disparity value on a same unit into an index map, combine the first confidence and the first target confidence into a confidence map, optimize the index map and the confidence map to obtain a final disparity map; and
convert the final disparity map to a final depth map.

7. The electronic device of claim 6, wherein the processor is further configured to:
calibrate internal parameters and external parameters of the light-field-binocular system.

8. The electronic device of claim 6, wherein the processor is configured to calibrate the images obtained by the light field camera and the monocular camera to generate the image pattern, and determine the images having the image pattern as the input images by:
calibrating the images such that a resolution of the image obtained by the light field camera is same to a resolution of the image obtained by the monocular camera; and
indexing data of a four-dimensional light field in a spatial domain, wherein each pixel corresponds to a preset spatial position.

9. The electronic device of claim 6, wherein the processor is configured to obtain the first confidence and the first target confidence by:

$$C_1 = Var_{min},$$
$$C_{stereo} = \frac{Var_{mean}}{Var_{min}},$$

where, $C_1$ is the first confidence, $C_{stereo}$ is the first target confidence, $Var_{min}$ is a minimum value of variances, and $Var_{mean}$ is an average value of variances.

10. The electronic device of claim 6, wherein the processor is configured to convert the disparity map into the depth map by:

$$Depth = \begin{cases} \frac{f \times B}{D} \\ \frac{f \times b}{D} \end{cases},$$

where, D is the disparity map, f is a focal length of the camera, B is a baseline between the monocular camera and the light field camera, b is a baseline between sub-images of the light field camera.

11. A non-transitory computer readable storage medium, having one or more computer programs stored thereon, wherein when the one or more computer programs are executed by a processor, a depth information calculation method based on a light-field-binocular system is executed, the method comprising:
constructing the light-field-binocular system by a monocular camera and a light field camera;
calibrating images obtained by the light field camera and the monocular camera to generate an image pattern, and determining the images having the image pattern as input images;
obtaining a far-distance disparity map based on binocular information of the input images, setting a respective first confidence for each pixel in the disparity map, and obtaining a first target confidence;
in response to detecting that the first confidence of a pixel is smaller than a preset value, determining a new disparity value based on light field information of the input images, determining an update depth value based on the new disparity value to replace an original depth value of the pixel, and obtaining a second target confidence of the pixel; and
combining the far-distance disparity map and a disparity map formed by the new disparity value on a same unit into an index map, combining the first confidence and the first target confidence into a confidence map, optimizing the index map and the confidence map to obtain a final disparity map;
and converting the final disparity map to a final depth map.

12. The non-transitory computer readable storage medium according to claim 11, wherein the method further comprises:
calibrating internal parameters and external parameters of the light-field-binocular system.

13. The non-transitory computer readable storage medium according to claim 11, wherein calibrating the images obtained by the light field camera and the monocular camera to generate the image pattern, and determining the images having the image pattern as the input images, comprises:
- calibrating the images such that a resolution of the image obtained by the light field camera is same to a resolution of the image obtained by the monocular camera; and
- indexing data of a four-dimensional light field in a spatial domain, wherein each pixel corresponds to a preset spatial position.

14. The non-transitory computer readable storage medium according to claim 11, wherein the first confidence and the first target confidence are calculated by:

$$C_1 = Var_{min},$$
$$C_{stereo} = \frac{Var_{mean}}{Var_{min}},$$

where, $C_1$ is the first confidence, $C_{stereo}$ is the first target confidence, $Var_{min}$ is a minimum value of variances, and $Var_{mean}$ is an average value of variances.

15. The non-transitory computer readable storage medium according to claim 11, wherein a conversion formula converting the disparity map into the depth map is represented by:

$$\text{Depth} = \begin{cases} \dfrac{f \times B}{D} \\ \dfrac{f \times b}{D} \end{cases},$$

where, D is the disparity map, f is a focal length of the camera, B is a baseline between the monocular camera and the light field camera, b is a baseline between sub-images of the light field camera.

* * * * *